(12) United States Patent
Matsumoto

(10) Patent No.: US 8,780,095 B2
(45) Date of Patent: Jul. 15, 2014

(54) PROJECTOR AND CONTROL METHOD

(75) Inventor: Morio Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 653 days.

(21) Appl. No.: 13/005,088

(22) Filed: Jan. 12, 2011

(65) Prior Publication Data

US 2011/0169806 A1 Jul. 14, 2011

(30) Foreign Application Priority Data

Jan. 14, 2010 (JP) ................................ 2010-005670

(51) Int. Cl.
G09G 5/00 (2006.01)
H04N 9/31 (2006.01)
H04N 5/63 (2006.01)

(52) U.S. Cl.
CPC ........... *H04N 9/3197* (2013.01); *H04N 9/3102* (2013.01); *H04N 5/63* (2013.01)
USPC ........... 345/204; 345/211; 345/213; 345/690; 353/30

(58) Field of Classification Search
USPC ............. 345/204, 211–213, 690; 353/122, 30
See application file for complete search history.

(56) References Cited

U.S. PATENT DOCUMENTS

| 6,741,240 B1 * | 5/2004 | Akaiwa et al. ................. 345/213 |
| 2002/0113952 A1 * | 8/2002 | Matoba et al. ................. 353/122 |
| 2006/0267864 A1 | 11/2006 | Miyazawa et al. |
| 2008/0074411 A1 * | 3/2008 | Yamashita ..................... 345/211 |
| 2010/0123545 A1 * | 5/2010 | Ozawa ........................... 340/5.8 |
| 2010/0128184 A1 * | 5/2010 | Moriwaki et al. ............ 348/744 |

FOREIGN PATENT DOCUMENTS

| JP | A-2003-98946 | 4/2003 |
| JP | A-2006-333368 | 12/2006 |
| JP | A-2007-279144 | 10/2007 |
| JP | A-2008-79335 | 4/2008 |

* cited by examiner

*Primary Examiner* — Jennifer Nguyen
(74) *Attorney, Agent, or Firm* — Oliff PLC

(57) ABSTRACT

A projector includes: an interface section that has a plurality of connection terminals receiving image information from source devices, a projecting section that projects an image, a storage control section that stores identification information that denotes the source device, an instruction information input section accepting instruction information, a power-supply, a power-supply control section that controles the power-supply, a determination section, and a control information generation section that generates control information, wherein, in a case where the determination section determines that the instruction information is information of designating switching on the power-supply, the power-supply control section switches on the power-supply, the control information generation section generates switching on control information designating switching on the source device that is denoted with the identification information, and the interface section outputs the switching on control information to the source device that is denoted with the identification information.

7 Claims, 4 Drawing Sheets

PROJECTOR AND CONTROL METHOD

CROSS-REFERENCE

The present application claims priority from Japanese Patent Application No. 2010-005670 filed on Jan. 14, 2010, which is hereby incorporated by reference in its entirety.

BACKGROUND

A control of a source device has been suggested in which a CEC (Consumer Electronics Control) command such as a power-supply ON command is transmitted with respect to the source device from a link device in an image display system that uses the source device (for example, a hard disk recorder, a DVD player or set-top box) based on the standard of HDMI and the link device (for example, a projector or a television).

For example, Japanese Patent Publication No. 2008-79135 describes a transmitting method of the CEC command such as the power-supply ON command with respect to the source device that is selected by a user in one of the set-top box or the DVD player that is connected to a liquid crystal display device in a state where the liquid crystal display device is activated. In a case where such a method is used, generally the user selects a desired source device in a state that a list of source devices that is connected to the link device is displayed.

However, in the projector, since the time during which the image is to be in a displayable state is relatively long compared to a display device such as a television, the time taken in the method is excessively long in a case where the activation of the projector occurs in tandem with the activation of the source device.

Also, in the case where the activation of the projector occurs in tandem with the activation of the source device, a transmitting method of the power-supply ON command with respect to the projector when the source device is activated is considered. However, since the source device takes along time to activate the hard disk recorder, the time during which the image is to be in a projectable state in the method is relatively long compared to a transmitting method of the power-supply ON command with respect to the source device when the projector is activated.

Further, in a situation in which a plurality of source devices is connected to the projector, the projector needs to select a suitable source device among a plurality of source devices and activate it so that the activation of the projector might occur in tandem with the activation of the source device.

SUMMARY

Various embodiments may provide a projector and a control method in which a suitable source device may be operated in tandem with an operation of the projector, in a situation that a plurality of source devices is connected to the projector.

According to at lest one embodiment of the disclosure, there is provided a projector including, an interface section that has a plurality of connection terminals to which image information is input from source devices that are different from each other, a projecting section that projects an image based on the image information, a storage control section that stores identification information that denotes the source device outputting the image information in a storage section, an instruction information input section to which instruction information is input, a power-supply, a power-supply control section that controls the power-supply, a determination section that determines based on the instruction information, and a control information generation section that generates a control information, wherein, the determination section determines whether the instruction information is information that designates switching on the power-supply or not, the power-supply control section switches on the power-supply in a case where the instruction information is determined to be information that designates the switching on the power-supply by the determination section, the control information generation section generates the switching on control information that designates, as the control information, switching on the source device that is denoted with a identification information in a case where the instruction information is determined to be information that designates switching on the power-supply by the determination section, and the interface section outputs the switching on control information to the source device that is denoted with the identification information.

According to at least one embodiment of the disclosure, there is provided a control method of a projector having an interface section that has a plurality of connection terminals to which image information is input from source devices that are different from each other, a projecting section that projects an image based on the image information, an instruction information input section in which instruction information is input, a storage section and a power-supply, the method including: storing identification information that denotes the source device that outputs the image information in the storage section; determining whether the instruction information is information that designates switching on the power-supply or not; switching on the power-supply in a case where the instruction information is determined to be information that designates switching on the power-supply; generating, as the identification information, switching on control information that designates switching on the source device that is denoted with the control information, and outputting the switching on control information to the source device that is denoted with the identification information.

In this case, the projector can switch on the suitable source device in tandem with switching the projector on in a situation in which a plurality of source devices is connected.

The storage control section may store, in the storage section, the identification information that denotes the source device that outputs the image information just previous the instruction in a case where the instruction information is determined to be information that designates switching off the power-supply by the determination section.

In this case, the projector stores the identification information that denotes the source device that outputs the just previous image information in the storage section when the projector is switched off so that the suitable source device can be switched on in tandem with switching the projector on.

The control information generation section may generate, as the control information, switching off control information that designates switching off the source device that is denoted with the identification information in a case where the instruction information is determined to be information that designates switching off the power-supply by the determination section, the interface section outputs the switching off control information to the source device that is denoted with the identification information, and the power-supply control section switches off the power-supply in a case where the instruction information is determined to be information that designates switching off the power-supply by the determination section.

In this case, the projector can switch off the suitable source device in tandem with switching the projector off.

The projecting section may include, a lamp, and a lamp control section that controls the lamp, wherein the interface section starts the output of the switching on control information before the lamp control section switches on the lamp.

In this case, the projector starts the output of the switching on control information before the lamp is switched on so that the lamp can be switched on intensively. Thus, the lamp can be suitably switched on. Also, the projector makes the source device be in an activated state during the period from when the lamp is switched on to when the image is displayed.

The plurality of connection terminals may be connected to different source devices through HDMI cables respectively, and the control information generation section generates a CEC command as the control information.

According to the aspects of the invention, the projector can easily perform the control since the source device can be controlled by using the CEC command.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereinafter, preferred embodiment of the invention will be described in detail in accordance with the accompanying drawings. The embodiment that is illustrated below does not limit the content of the invention that is described in the claims. Also, the entire configuration that is illustrated in the embodiment is not limited to the essential configuration as means of solution of the invention.

First Embodiment

Figure 1:
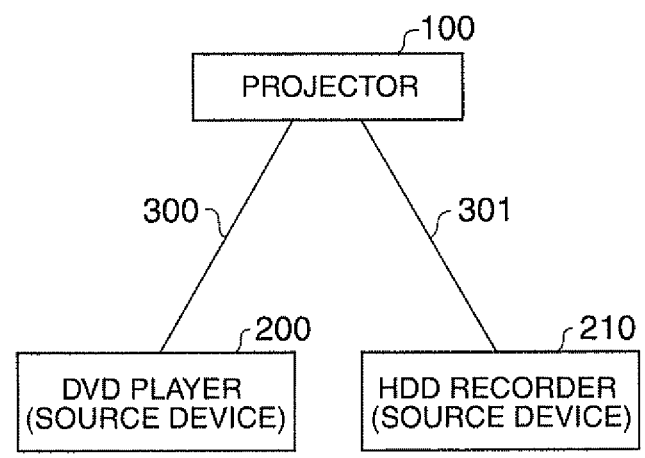
FIG. 1 is a drawing illustrating a connection situation of a projector according to a first embodiment.

FIG. 1 is a drawing illustrating a connection situation of a projector 100 according to a first embodiment. The projector 100 is connected to a DVD player 200 through a HDMI cable 300 and connected to a HDD recorder 210 through a HDMI cable 301. The projector 100 projects an image based on image information from a DVD player 200 or a HDD recorder 210 that is a type of source device. Also, the projector 100 has a function that stores identification information of the source device that outputs the image information just before the power-supply OFF is performed and activates in tandem with the source device when power-supply of the projector 100 is ON.

Figure 2:
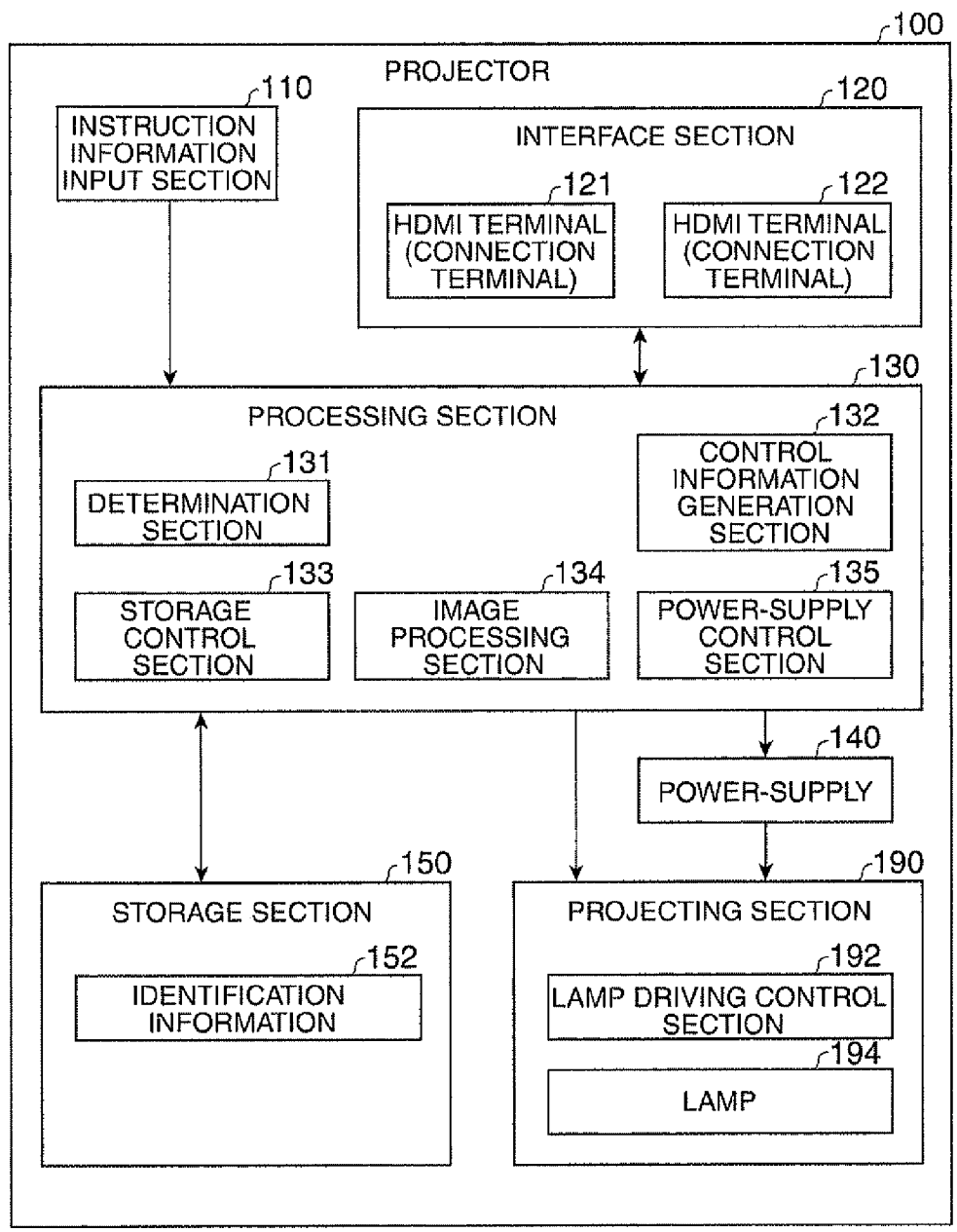
FIG. 2 is a drawing of a function block illustrating the projector according to the first embodiment.

Next, a function block of the projector 100 having the above-described function will be described. FIG. 2 is a drawing of a function block illustrating the projector 100 according to the first embodiment. The projector 100 is configured of and includes a instruction information input section 110 in which instruction information is input from operation buttons of a main body of the projector 100 or a remote controller, a interface section 120 in which the image information is input from the source device, a processing section 130 that performs all types of processes, a power-supply 140, a storage section 150 that stores identification information 152 or the like and a projecting section 190.

An interface section 120 is configured of and includes HDMI terminals 121 and 122 that are a type of connection terminal. Also, a processing section 130 is configured of and includes a determination section 131 that performs all types of determination, a control information generation section 132 that generates control information, a storage control section 133 that stores identification information 152 in the storage section 150, an image processing section 134 and a power-supply control section 135. Also, a projecting section 190 is configured of and includes a lamp 194 and a lamp driving control section 192 that drives and controls the lamp 194.

The projector 100 may also be functioned as each of sections using hardware as described below. For example, in the projector 100, the instruction information input section 110 may use a light receiving unit or the like, the processing section 130 may use a CPU, an image process circuit or the like, the storage section 150 may use a nonvolatile memory or the like and the projecting section 190 may use the lamp 194, a lamp driving circuit, a liquid crystal panel, a liquid crystal driving circuit, a lens or the like.

Figure 3:
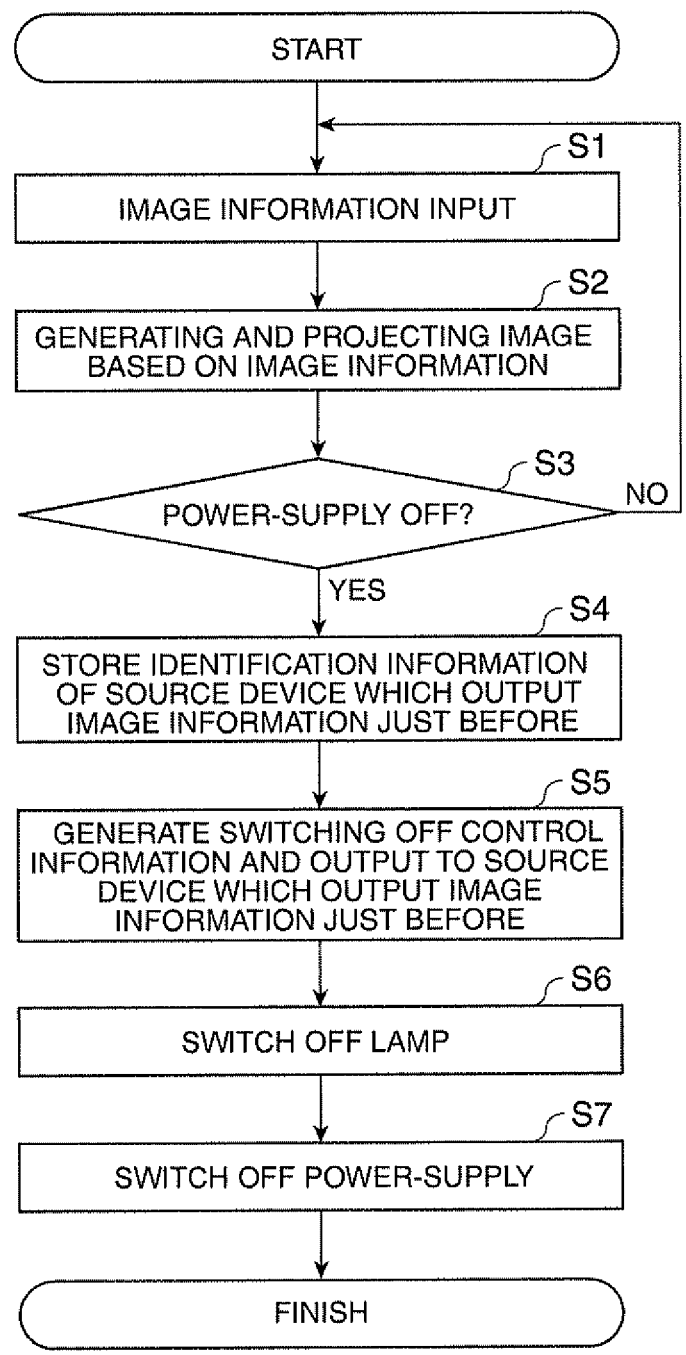
FIG. 3 is a flowchart illustrating a process flow when the power supply is OFF according to the first embodiment.

Next, in the projector 100, a process flow when the power-supply is ON and the power-supply is OFF will be described. FIG. 3 is a flowchart illustrating a process flow when the power supply is OFF according to the first embodiment.

In the embodiment, the image information is input to the projector 100 from the DVD player 200. The image information is input to the HDMI terminal 121 through the HDMI cable 300 from the DVD player 200 (step S1).

The image processing section 134 corrects color, brightness or the like with respect to the image information and the projecting section 190 generates and projects the image based on the image information from the image processing section 134 (step S2).

The determination section 131 determines whether the instruction information that designates that the power-supply OFF command (switching off the power-supply 140) is input to the instruction information input section 110 or not (step S3). For example, a user presses a power-supply button of the remote controller and then the user can designate the power-supply OFF command.

The projector 100 repeatedly performs the process of steps S1 to S3 while the image information is input in a case where the power-supply OFF command is not designated. Meanwhile, in a case where the power-supply OFF command is designated, the storage control section 133 stores the identification information 152 of the source device (here, the DVD player 200) that outputs the just previous image information in the storage section 150 (step S4).

Also, the identification information 152 is for example, information that denotes the source device or information that denotes the HDMI terminals 121 and 122 in which the source device is connected. Information that denotes the source device may be acquired for example, by transporting or receiving information between the interface section 120 and the source device.

In a case where the power-supply OFF command is designated, the control information generation section 132 generates switching off control information (for example, CEC command) and the interface section 120 outputs the switching off control information to the source device that output the just previous image information (step S5).

The power-supply control section 135 stops the driving of the lamp 194 by using the lamp driving control section 192 after the output of the switching off control information (step S6), switches off the power-supply 140 (step S7).

Figure 4:
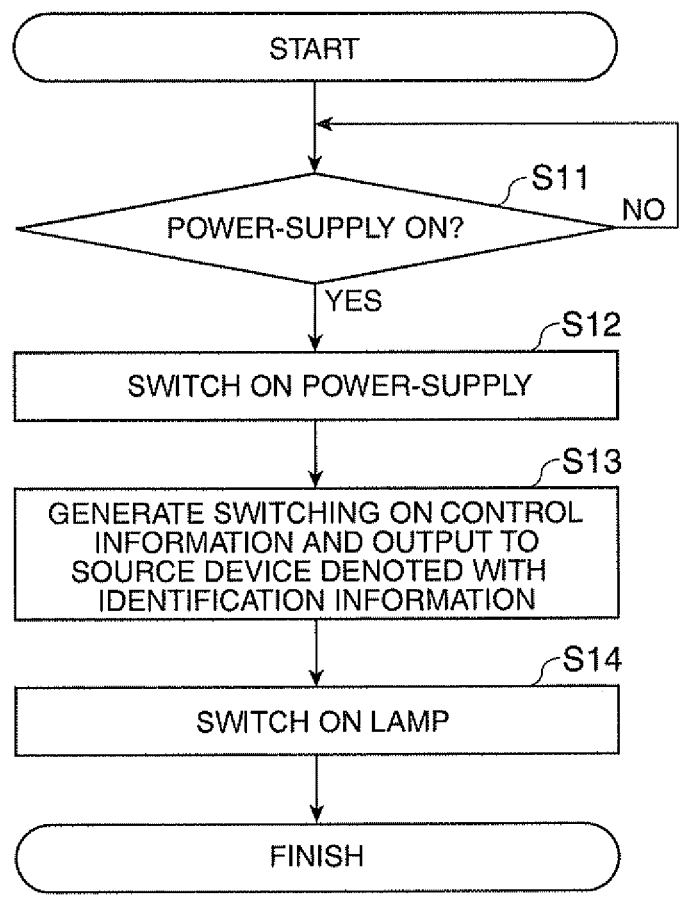
FIG. 4 is a flowchart illustrating a process flow when the power supply is ON according to the first embodiment.

Next, a process flow when the power-supply is ON in the projector 100 will be described. FIG. 4 is a flowchart illustrating a process flow when the power supply is ON according to the first embodiment.

The determination section 131 determines whether the instruction information that designates the power-supply ON command (switching on the power-supply 140) is input to the instruction information input section 110 or not (step S11). For example, the user presses a power-supply button of the remote controller and then the user can designate the power-supply ON command.

In a case where the power-supply ON command is designated, the power-supply control section 135 switches on the power-supply 140 (step S12), the control information generation section 132 generates the switching on control information (for example, CEC command) to switch on the source device (here, the DVD player 200) that is denoted with the identification information 152 and the interface section 120 outputs the switching on control information to the source device that is denoted with the identification information 152 (step S13).

The lamp driving control section 192 switches on the lamp 194 after switching on the power-supply 140 (step S14). Thus, the projector 100 makes the image be in a projectable state based on the image information from the source device.

As described above, according to the embodiment, the projector 100 can switch off the suitable source device in tandem with switching off the projector 100 and can switch in the suitable source device in tandem with switching on the projector 100 in a situation in which a plurality of source devices is connected. Also, in a case where the projector 100 is not connected to the HDMI cables 300 and 301 and the source device that is denoted with the identification information 152 is not present, only the projector 100 is switched on.

According to the embodiment, the projector 100 stores the identification information 152 that denotes the source device that outputs the just previous image information at the time of switching off the projector 100 in the storage section 150 so that the suitable source device can be switched on in tandem with switching on the projector 100. Also, the operation of the source device which outputs the just previous image information is in tandem with the operation of the projector 100 because the image projection potential is high using the image information from the source device even when the projector 100 is activated the next time.

According to the embodiment, the projector 100 starts the output of the switching on control information before the lamp 194 is switched on and the switching on control of the lamp 194 may be intensively performed so that the lamp 194 may be suitably switched on. Thus, the projector 100 can make the source device be in an activated state in a period from when the lamp 194 is switched on to when the image is displayed.

Also, according to the embodiment, since the user can operate the source device in tandem with the projector 100 using one remote controller, the projector 100 can enhance the usability of the user.

Further, according to the embodiment, since the projector 100 can control the source device using the CEC command, the control can be more easily performed compared to a case in which a special command is used.

Other Embodiment

The application of the invention is not limited to the above-described embodiment and various modified embodiments can be made. For example, the number of the source devices and the number of the connection terminals connected to the projector 100 is not limited to two and may be three or more.

Also, the connection terminal is not limited to the HDMI terminals 121 and 122, and various terminals that can input the image information and can output the control information may be employed. The control information that is generated from the control information generation section 132 is not limited to the switching on control information and the switching off control information, and may be control information that starts regeneration of content, control information that stops the regeneration of content or the like.

Also, a computer having the projector 100 may be employed as the determination section 131 that reads a program stored in an information storage medium or the like. The information storage medium may apply for example, a CD-ROM, a DVD-ROM, a ROM, a RAM and a HDD.

The projector 100 is not limited to the liquid crystal projector (a translucent type, a reflecting type such as a LCOS) and may be a projector that uses a digital micro mirror device or the like. Also the function of the projector 100 may be dispersed to a plurality of devices (for example, a PC and a projector, and an external memory and a projector that has the function of the storage section 150).

What is claimed is:

1. A projector comprising:
    an interface section that has a plurality of connection terminals to which image information is input from source devices that are different from each other,
    a projecting section that projects an image based on the image information,
    a storage control section that stores identification information that denotes the source device outputting the image information in a storage section,
    an instruction information input section to which instruction information is input,
    a power-supply,
    a power-supply control section that controls the power-supply,
    a determination section that determines based on the instruction information, and
    a control information generation section that generates control information,
    wherein the projecting section includes:
        a lamp, and
        a lamp control section that controls the lamp,
    wherein, the determination section determines whether the instruction information is information that designates switching on the power-supply or not,
    the power-supply control section switches on the power-supply in a case where the instruction information is determined to be information that designates switching on the power-supply by the determination section,
    the control information generation section generates, as the control information, switching on control information that designates switching on the source device that is denoted with the identification information in a case where the instruction information is determined to be information that designates switching on the power-supply by the determination section,
    the interface section outputs the switching on control information to the source device that is denoted with the identification information,
    the interface section starts the output of the switching on control information before the lamp control section switches on the lamp, and
    the identification information denotes the source device that outputs the image information just previous the instruction in a case where the instruction information is determined to be information that designates switching off the power-supply by the determination section.

2. The projector according to claim 1, wherein the control information generation section generates, as the control information, switching off control information that designates switching off the source device that is denoted with the identification information in a case where the instruction information is determined to be information that designates switching off the power-supply by the determination section, the interface section outputs the switching off control information to the source device that is denoted with the identification information, and the power-supply control section switches off the power-supply in a case where the instruction information is determined to be information that designates switching off the power-supply by the determination section.

3. The projector according to claim 1, wherein the plurality of connection terminals is connected to different source devices through HDMI cable respectively, and the control information generation section generates a CEC command as the control information.

4. A control method of projector having an interface section that has a plurality of connection terminals to which image information is input from source devices that are different from each other, a projecting section that projects an image based on the image information, instruction information input section in which instruction information is input, a storage section and a power-supply, the projecting section including a lamp, the method comprising:

storing identification information that denotes the source device that outputs the image information in the storage section;

determining whether the instruction information is information that designates switching on the power-supply or not;

switching on the power-supply in a case where the instruction information is determined to be information that designates switching on the power-supply;

generating, as the control information, switching on control information that designates switching on the source device that is denoted with the identification information;

outputting the switching on control information to the source device that is denoted with the identification information; and switching on the lamp after starting outputting the switching on control information, wherein the identification information denotes the source device that outputs the image information just previous the instruction in a case where the instruction information is determined to be information that designates switching off the power-supply.

5. The control method according to claim 4, further comprising:

generating, as the control information, switching off control information that designates switching off the source device that is denoted with the identification information in a case where the instruction information is determined to be information that designates switching off the power-supply, outputting the switching off control information to the source device that is denoted with the identification information, and switching off the power-supply in a case where the instruction information is determined to be information that designates switching off the power-supply.

6. The control method according to claim 4, wherein the plurality of connection terminals is connected to different source devices through HDMI cable respectively, and a CEC command is generated as the control information.

7. A control method of projector having an interface section that has a plurality of connection terminals to which image information is input from source devices that are different from each other, and a projecting section that includes a lamp, the method comprising:

storing identification information that denotes the source device that outputs the image information;

switching on the projector according to instruction information designating switching on the projector;

generating switching on control information that designates switching on the source device that is denoted with the identification information;

outputting, via the interface section, the switching on control information to the source device that is denoted with the identification information; and switching on the lamp after starting outputting the switching on control information, wherein the identification information denotes the source device that outputs the image information just previous the instruction in a case where the instruction information is determined to be information that designates switching off the projector.

* * * * *